United States Patent [19]

Hilal

[11] Patent Number: 5,071,831
[45] Date of Patent: Dec. 10, 1991

[54] SUPERCONDUCTIVE GEARS AND CLUTCHES

[75] Inventor: Mohamed A. Hilal, Madison, Wis.

[73] Assignee: International Superconductor Corp., Riverdale, N.Y.

[21] Appl. No.: 300,284

[22] Filed: Jan. 19, 1989

[51] Int. Cl.⁵ .............................................. F16D 27/00
[52] U.S. Cl. ........................................ 505/1; 505/700; 192/84 R; 192/84 E
[58] Field of Search ............... 192/21.5, 84 R, 84 E, 192/84 PM; 464/29; 505/1, 825, 700

[56] References Cited

U.S. PATENT DOCUMENTS 3,085,407 4/1963 Tomlinson ............... 192/84 PM X
4,804,649 2/1989 Sherif ........................... 505/1

FOREIGN PATENT DOCUMENTS 929907 5/1982 U.S.S.R. .......................... 192/84 R
1086251 4/1984 U.S.S.R. ........................ 192/84 PM
1272031 11/1986 U.S.S.R. ............................ 464/29

Primary Examiner—Richard Lorence
Attorney, Agent, or Firm—Herbert Dubno

[57] ABSTRACT

Rotating gears and clutches which exhibit no contact, and which incorporate high-$T_c$ superconducting ceramic compositions. The devices can have two discs of selected proportion, coupled to each other by a controllable magnetic field, so as to transmit the desired torque in a given application. These devices are most useful in ultra-high speed rotational apparatus, where conventional devices cannot be used because of limitations in strengths of materials used for such applications.

15 Claims, 4 Drawing Sheets

SUPERCONDUCTIVE GEARS AND CLUTCHES

FIELD OF THE INVENTION

My present invention relates to high-$T_c$ superconducting materials, used in rotating devices to transmit torque and power, in applications where ultra-high speeds of rotation do not permit the use of conventional designs and materials.

BACKGROUND OF THE INVENTION

The discovery of ceramic compositions having superconducting properties is of recent origin. Orginally, superconductivity was observed in mercury at 4K by the Dutch scientist, Heike Onnes. The term, superconductivity, refers to the property wherein a normally resistive conductor abruptly loses all resistance to electrical flow at a specific temperature, called the critical temperature, $T_c$. At this point, the resistivity of the normal conductor becomes zero.

In more recent times, Ogg (1946) studied superconductivity in quenched metal-ammonia solutions and proposed that superconductivity arose because of mobile electron-pairs.

Until recently, it was believed that superconductivity above 23K, was not possible. This belief was based on the theoretical work of Bardeen, Cooper and Schieffer (BCS theory-1946) which predicted such a limit. Several theoretical proposals were presented in the 1970's, suggesting that the critical temperature for superconductivity could be increased. However, the lack of any discoveries of superconductivity above 23K solidified the belief that indeed this temperature could not be exceeded.

Thus, in November, 1987, when Bednorz and Müller announced the discovery of a new ceramic superconducting compound based on lanthanum, barium, and copper oxides, whose critical temperature for superconductivity was close to 35K., (G. Bednorz and A. Müller, Z. Phys., B64 189 (1986), the declaration was greeted with considerable scepticism. Nevertheless, by the following month, the critical temperature, $T_c$, for the onset of superconductivity was raised to nearly 80K by C. W. Chu and coworkers (M. K. Wu, J. R. Ashburn, C. J. Tang, P. H. Hor, R. L. Meng, L. Gao, Z. J. Huang, Y. Q. Wang and C. W. Chu, Phys. Rev. Lett. 58 908 (1987). This was achieved by changing the composition to yttrium barium copper oxide, approximated by the formula:

$$Y_{1.0}Ba_{1.8}Cu_{3.0}O_{6.3}$$

This formula, determined experimentally, is not exactly stoichiometric. It is believed that this lack of specific stoichiometry contributes significantly to the onset of superconductivity.

The mechanism of superconductivity in such oxide-based ceramic materials is not at all well understood. Ogg's original contribution suggested that superconductivity arose in quenched metal-ammonia solutions because of mobile electron pairs. The concept accepted at present is similar (the BCS theory), and suggests that if a mobile electron propagates through a lattice structure, it will normally interact with the bound electrons of the lattice because of differences in the electron quantum spin number. However, if two such electrons form a pair which are bound through opposite spin-pairing (Cooper pairs), then no quantum interaction of the bound pairs can occur with the electrons of the lattice (which still have an electron moment).

The so-called 1:2:3 compound, composed of Y-Ba-Cu-O atoms, is prepared by the solid state reaction of the requisite oxides, vis:

$$Y_2O_3 + 2BaO + 3CuO = 2YBa_2Cu_3O_{6.5}.$$

It is now established (C. N. Rao et al., Nature, 327 185 (1987) that high $T_c$ superconductivity in the Y-Ba-Cu-O system originates from a compound of stoichiometry: $YBa_2Cu_3O_7$-¶, where "¶" is a value less than 1.0. This compound has the structure of the ideal perovskite, $TBa_2Cu_3O_9$. Thus, the superconductor $YBa_2Cu_3O_7$-¶ has about 25% fewer oxygen atoms present in the lattice as compared to the idealized cubic perovskite structure. This massive oxygen deficiency means that instead of the conventional three-dimensional crystalline cubic-stacking array of the perovskite, a unique layered structure results. A loss of even more oxygen atoms in this structure gives rise to the semiconductor $YBa_2Cu_3O_6$. The chain of copper atoms associated with a chain of oxygen atoms is believed to be the key to superconducting behavior. Yet the above description is an idealized one and the actual distinct structural conformation has not yet been delineated. Note that there appear to be extra oxygen atoms in the superconducting unit cell, compared to that of the semiconductor.

To date, most of the high-$T_c$ superconducting ceramic compositions announced to date are based on cuprate compounds having $Cu$-$O_2$ layers as part of the structure. Some of these have included:

Bismuth Strontium Calcium Copper Oxide:

$$Bi_2Sr_{3-x}Ca_xCu_2O_{8+y}$$

$$T_c = 114K.$$

Thallium Calcium (Barium) Copper Oxide:

Tl Ba$_2$ Ca Cu$_2$ O$_7$

Tl Ba$_2$ Ca$_2$ Cu$_3$ O$_9$

Tl Ba$_2$ Ca$_3$ Cu$_4$ O$_{11}$

Tl Ba$_2$ Ca$_4$ Cu$_5$ O$_{13}$ $$T_c = 120K.$$

Lead Strontium Lanthanide Copper Oxide $$Pb_2Sr_2(Nd_{0.76}Sr_{0.24})Cu_3O_{8+x}$$

$$T_c = 77K.$$

In the last compound given, the $CuO_2$—sheets are present but there is also a PbO-Cu-OPb sandwich as well, not observed in ceramic superconductors heretofore. The copper ions in this sandwich are monovalent and each is coordinated, above and below, to two oxygen atoms in the PbO layers. The copper atoms in the $CuO_2$ sheets have an average valence of about 2.25, which is consistent with previously discovered cuprate compounds, given above. However, the presence of $Cu^+$ atoms lowers the average valence of copper ions in the new structure to below 2.0, which is typical. Indeed, preparation conditions needed to prepare these compounds includes a mildly reducing atmosphere so as not to oxidize $Pb^{2+}$ to $Pb^{4+}$.

There have also been some compositions announced, based on a copper-free composition, vis:

$BaO-K_2O-Bi_2O_3$

This compound is said to become superconducting at about 30K. While copper-oxide superconductors exhibit layered structures that carry current efficiently only along certain planes, this new material is a three-dimensional network of bismuth and oxygen with properties that are much less sensitive to crystallographic direction. It is hoped that compositions will be discovered in this system with temperature properties that rival those of copper-bearing compounds.

The main advantage to superconducting compositions with higher $T_c$ values is that they can operate at liquid nitrogen temperature (78K), thus avoiding the need to use liquid helium. Superconducting ceramic compositions are normally prepared by weighing out specific quantities of selected oxides. The combination is thoroughly mixed by conventional means and then fired at elevated temperatures above about 950° C. The induced solid state reaction causes the formation of the desired ceramic composition and structure. Further annealing in an oxygen atmosphere has been found to improve the superconducting properties of the Y-Ba-Cu-O compound. The produced powder is then processed by convention means to form a bar (by compaction) which is then used as the superconducting medium.

A method to prepare a superconducting film, particularly for use on a silicon substrate as an integrated circuit, has been to deposit thin layers of the appropriate metal oxides in specific order by electron-beam evaporation. Copper is first deposited, then barium, and then yttrium. The sequence is repeated 6-times to obtain an "18-layer" stack of the three ingredients having a total thickness of 0.6-0.7 microns. To complete the process, the specimens are then annealed in oxygen atmosphere for five minutes and then cooled at a rate of about 120° C. per hour.

It is necessary to deposit a buffer layer of inert zirconia on the silicon substrate, before the oxides are deposited, in order to prevent the oxides from reacting with the silicon substrate before the superconducting composition formed. The annealing step was shown to be extremely critical since the oxygen content in the film must be precisely maintained within certain (unknown) limits for the superconductivity state to prevail.

Another approach to preparation of superconducting films has been to employ compounds which are volatile and to cause them to decompose on a hot surface in a partial vacuum. This method is well known for use in the preparation of integrated circuits on a silicon substrate. It is known as vapor phase epitaxy and is capable of producing a superconductive monocrystalline film, using halogen compounds (or others) as the source materials.

Still another method to form a superconducting film is to prepare a superconducting powder of $Y_{1.0}Ba_{1.8}Cu_{3.0}O_{7-x}$ composition, using conventional means. The initial preparation is checked for superconducting properties by measuring a pressed and sintered pellet. Once the material is found to have the desired properties, a powder slurry is made and the slurry is applied with a spin-coater. The layer is dried and then fired in an oxygen atmosphere. Best films are obtained when fired at 940°-1000° C. If sapphire is used as the substrate, the adherence was such that the films could be ground and polished. One could then etch the film with a laser to obtain a desired geometry of superconducting lines, similar to those of a printed circuit.

OBJECTS OF THE INVENTION

It is an object of the invention to provide clutches and gears which can be used in applications not possible heretofore where physical contact has limited the rates of revolution of conventional gears and clutches.

It is another object of my invention to provide improved gears and clutches which can operate at ultra high rotational speeds and do not require lubrication for operation.

A further object of the present invention is to provide a new use for high $T_C$ superconductors.

SUMMARY OF THE INVENTION

These objects and others which will become apparent hereinafter are attained by providing superconductive gears and clutches consisting of two superconductive discs. The discs are surrounded by a solenoid winding and are exposed to the magnetic field produced by the solenoid. The magnetic field penetrates through holes which are made in one of the discs and then through the other solid disc. The flux pinning force provides the coupling mechanism between the two discs. A unique feature of this device is its ability to be switched rapidly off and on so as to control the desired torque. The device can also be operated passively at constant torque if desired. Superconducting gears and clutches of this construction are suitable for high rpm applications where conventional gears cannot be efficiently used due to physical contact limitations.

A superconducting gear and clutch unit according to the invention can comprise two superconductive discs. One of the discs is solid and the other disc has holes. The two discs are subject to an axial field which is generated by solenoid winding. The operation of the superconducting gear and clutch can be explained as follows:

1. The solenoid enclosing the superconductive discs generates an axial field of the desired strength.
2. The superconducting gear and clutch discs are heated to cause transition of said discs to a normal (non-superconductive) state, thereby allowing the magnetic flux to penetrate both discs.
3. The discs are then cooled to cause transition to their superconducting state, and each is charged with a circulating current. The superconducting gear and clutch is thus ready for operation.
4. Magnetic flux lines penetrate through the lower disc as a pattern of fluxoids, coalescing as they leave the solid disc, and going through the holes in the upper disc.
5. The fluxoids merge as macroscopic fluxoids going through the hole enclosed by circulating shielding currents.
6. As the upper disc is rotated, the flux lines connecting the two discs will resist disjoinment and collapse of the field flux lines, said action resulting in generating a torque on the lower disc. The flux pinning sites within the superconducting material provide the pinning force which prevents disjoinment of the unit.
7. If the critical value of the pinning force is exceeded, the flux lines move within the lower disc. This will also be the case if the two discs are rotating at different revolutions per minute. The maximum value of the coupling torque is reached when the critical value of the pinning force is reached or exceeded.

8. If the separation between the two discs is large, the fluxoids do not couple the two discs as distinct identities. The fluxoids penetrating the solid disc are continuously forced to move across the disc following the motion of the holes of the other disc. A slip will thus exist between the two discs.

The mechanism of operation of the superconducting gear and clutch can be explained in that the magnetic field within the holes induces circulating currents in the disc material in the same direction as the current circulating around the holes. A torque is thus generated due to the interaction between the current loops in the two discs.

Different superconducting gear and clutch configurations can be manufactured to suit the required application.

I have determined that the theory of the flux lines and pinning mechanism can be explained as follows:

The force generated due to the flux lines linkage is approximately given by $$F = f_G \frac{B\pi d^2}{4} J_c$$

where:
B is the magnetic field
d is the hole diameter
$J_c$ is the critical current density
$f_G$ is a geometry factor
The torque is given by:

$$T = nf_G \frac{B\pi d^2}{4} J_c R$$

Assuming that Jc=109 A/cm2, B=10T, d=0.2 cm, and R=1 cm, given that T=0.314 $nf_G$ in kN.m, assuming n=8 and $f_G$=1, results in a 2.513 kN.m. of torque. This value is significant in that it makes the use of superconducting gears and clutches very attractive in many applications.

For example:

1. Two discs are prepared form a selected superconducting ceramic. In general, a single crystal rod is sliced to obtain the disc. Although a disc prepared by pressing a selected superconducting powder could be use, the powder discs do not in general have the required strengths to rotate at ultra-fast speeds without rupture. One disc has a selected array of holes formed in it, usually by coring, as is known in the art. Alternately, one can use laser ablation to form the holes. Both the solid and perforated discs then have shafts attached to them. Both are then placed in proximity within the magnetic field of a selected solenoid, and caused to assume the superconducting state by cooling them below their critical temperature. The discs are then charged with a circulating current. The gear and clutch assembly is then ready for use.

2. Alternately, a substrate can be coated with a selected superconducting film. The substrate may be chosen from: sapphire, strontium titanate and alumina. A suitable powder slurry is prepared and a thin film is cast by spin-casting on the substrate. It is best to form holes in one of the substrate discs before the thin layer is cast. The thin layer is then dried and the whole is fired in an oxygen atmosphere at 940° C. for several hours.

The discs having the said thin layers so-formed on them are then mounted in the desired apparatus, as before, and are placed within the magnetic field of a solenoid and activated in a manner described previously.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1A:
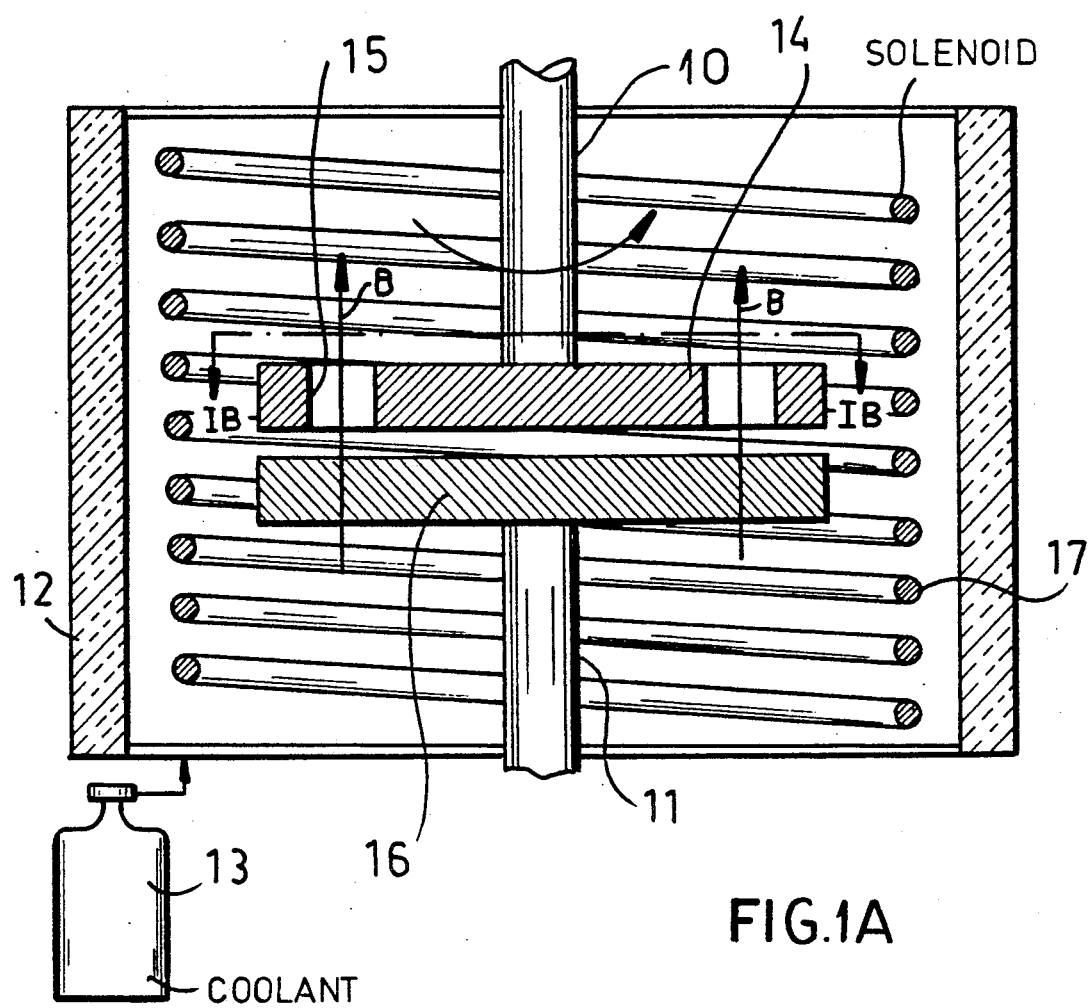
FIG. 1A is a diagrammatic axial section through one embodiment of an assembly for coupling to rotatable members according to the invention.
Figure 1B:
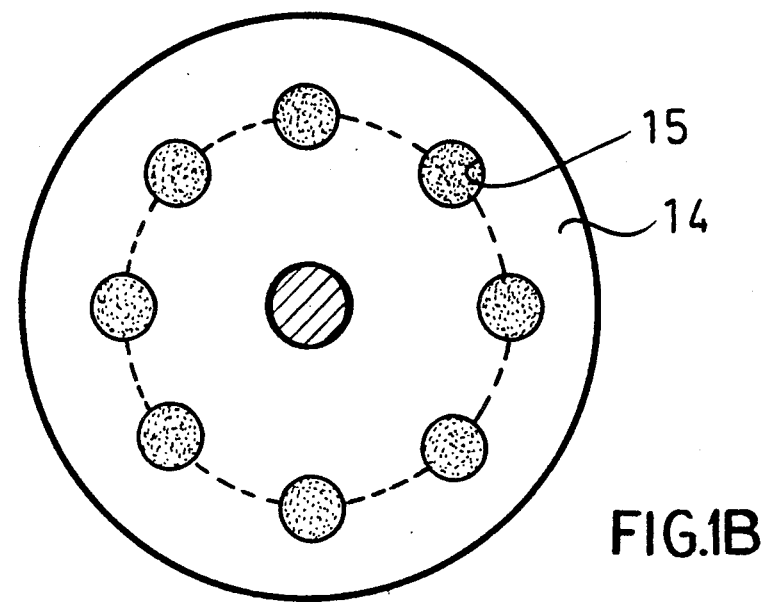
FIG. 1B is a cross sectional view taken along the line 1B—1B of FIG. 1A.

FIG. 1A shows a superconductive clutch arrangement in which a shaft 10 constituting a driving member is axially aligned with a shaft 11 constituting a driven member in an insulated housing 12 forming an enclosure in the clutch to which liquid nitrogen can be supplied at 13 to cool the superconductive disks to a temperature below the critical temperature $T_c$.

The driving member 10 is provided with a disk 14 composed at least in part of superconductive material and formed with openings 15 in the form of a circular array of angularly equispaced bores.

A superconducting disk 16 without such bores is provided in spaced juxtaposition with the disk 14.

A coil or solenoid 17 axially surrounds the assembly and is energized to generate a pinning flux represented by the arrows B for rotationally coupling the two disks as previously described. When the applied magnetic field is turned off or the temperature raised above $T_c$, the magnetic coupling is terminated and the disk 14 and shaft 10 rotate freely without entrainment of the disk 16 and the shaft 11.

Figure 2A:
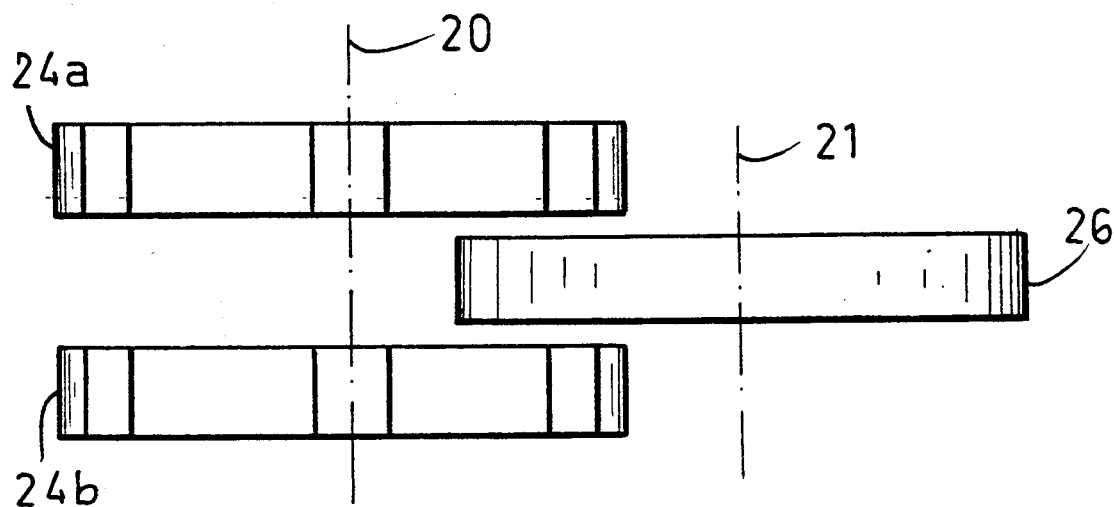
FIG. 2A is a diagrammatic elevation of another apparatus according to the invention.
Figure 2B:
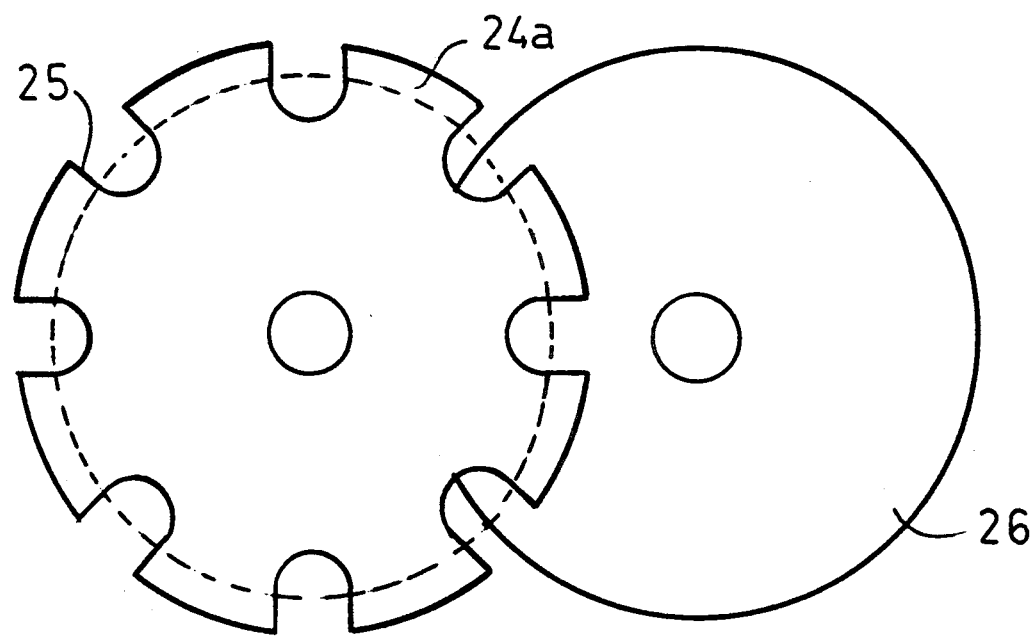
FIG. 2B is a plan view of this embodiment.

A gear or clutch arrangement of the type shown in FIG. 2A and 2B can likewise be enclosed in a housing so as to be cooled and provided with a coil for applying a magnetic field.

In this case, two disks 24a and 24b are coupled together along an axis 20 which is offset from the axis 21 of the disk 26. Instead of holes, the openings in the disks 24a and 24b are notches 25 formed in the peripheries of the disks 24a and 24b so that the flux lines can pass through these openings. Apart from the fact that the disk 26 is received between the disks 24a and 24b and is set in rotation in a sense opposite that of the driven disks 24a, 24b when the magnetic field is applied, flux pinning is effected in the manner described in this embodiment as well.

Figure 3A:
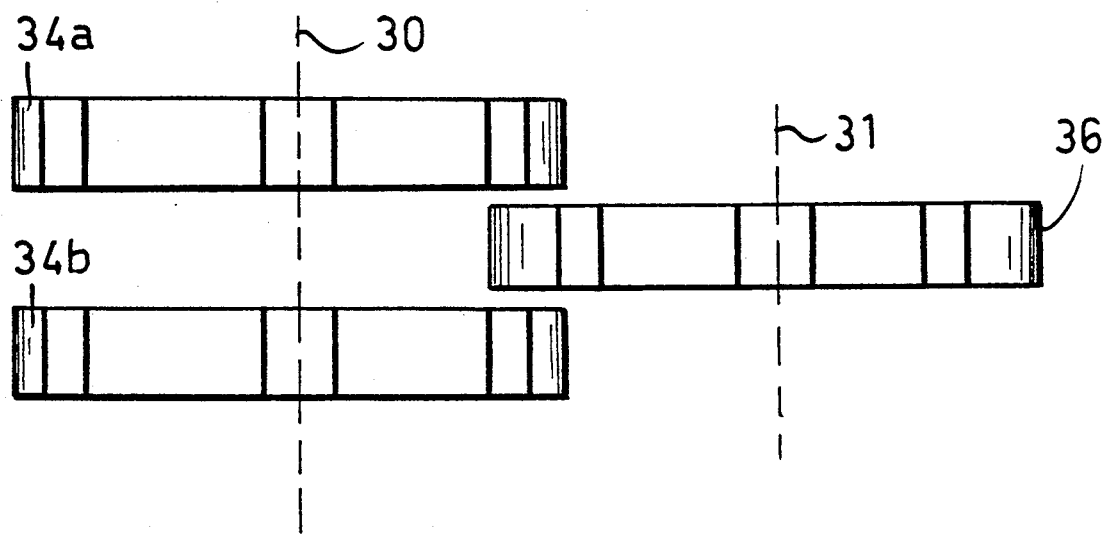
FIGS. 3A and 3B are views similar to FIGS. 2A and 2B, respectively, illustrating still another embodiment of the invention.
Figure 3B:
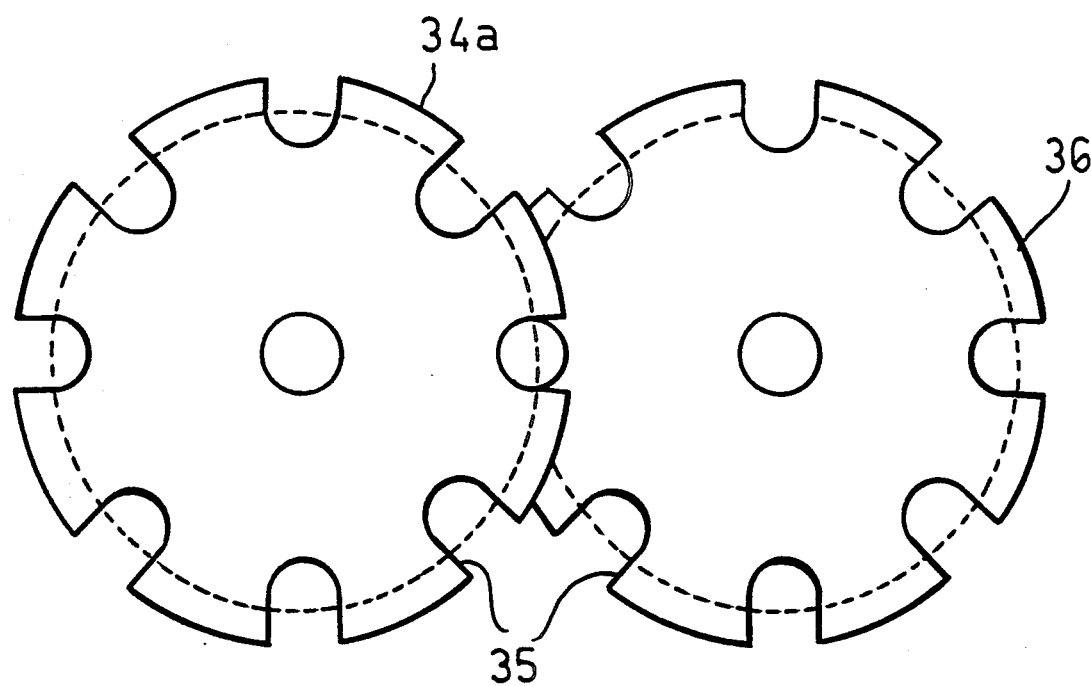

In the embodiment of FIG. 3A and FIG. 3B, the pair of disks 34a, 34b and the disk 36 rotatable respectively about the axes 30 and 31 are provided with the notches 35 as described in connection with FIGS. 2A and 2B.

Here as well, rotation of the drive and driven disks is effected in opposite senses. A transmission ratio may be established by having the diameter of the drive disk greater than or less than the diameter of the driven disks.

Figure 4:
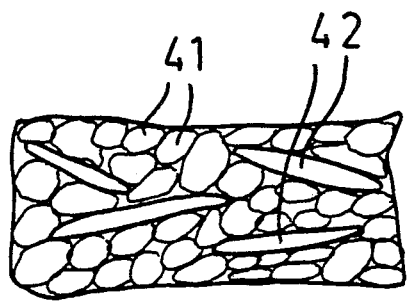
FIG. 4 is a sectional view through a disk greatly enlarged in scale.
Figure 5:
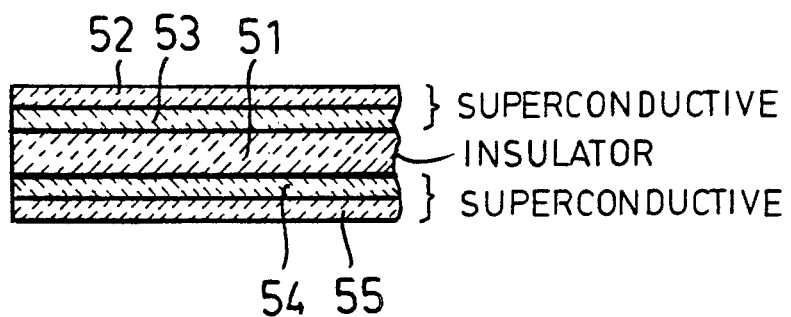
FIG. 5 is a fragmentary sectional view through another disk in accordance with the invention.

As can be seen from FIGS. 4 and 5, while the disks may be composed entirely of superconductor oxide ceramic, it is also possible to provide particles of the superconductive oxide ceramic or grains thereof as shown at 41 in a matrix of conductive filaments 42, e.g. of copper metal.

FIG. 5 the disk is shown to comprise a nonsuperconductive or insulating layer 51, e.g. of silicon, upon which a number of thin superconductive layers 52, 53, 54 and 55 have been deposited.

The disks can be formed at least in part of a superconductive material selected from the group which consists substantially of:

$Y_{1.0}Ba_{1.8}Cu_{3.0}O_{6.3}$, $Bi_2Sr_{3-x}Ca_xCu_2O_{8+y}$, $Tl_2Ca_{3-x}Ba_xCu_2O_{8+y}$, $Pb_2Sr_2(Nd_{0.76}Sr_{0.24})Cu_3O_{8+x}$, and $BaO$-$K_2O$-$Bi_2O_3$-based superconductors, wherein x is a number less than one.

I claim:

1. A method of rotationally coupling a drive member to a driven member, comprising the steps of:

forming one of said members with a disk lying in a plane generally perpendicular to an axis of rotation of said one of said members, and the other of said members with disk lying in a plane generally perpendicular to an axis of rotation of said other of said members and positioning said members so that said disks are disposed in planes parallel with one another and the axes of rotation said members are parallel with one another, said disks being spacedly juxtaposed at least partially with one another and being composed at least in part of a high-temperature ceramic superconductor having a critical temperature $T_c$ above 23K;

maintaining said disks at a temperature below said critical temperature for a period during which said drive member is to be rotationally coupled to said driven member; and applying a magnetic field to said disks affecting magnetic flux coupling thereof, whereby rotation of said disk formed on said drive member effects rotational entrainment of said disk formed on said driven member.

2. The method defined in claim 1 wherein said disks are formed at least in part of a superconductive material selected from the group which consists substantially of:

$Y_{1.0}Ba_{1.8}Cu_{3.0}O_{6.3}$, $Bi_2Sr\ 3-xCa_xCu_2O_{8+y}$, $Tl_2Ca_{3-x}Ba_xCu_2O_{8+y}$, $Pb_2Sr_2(Nd_{0.76}Sr_{0.24})Cu_3O_{8+x}$.

and $BaO$-$K_2O$-$Bi_2O_3$-based superconductors, wherein x is a number less than one.

3. The method defined in claim 2 wherein said disks are axially juxtaposed and the magnetic field is applied as an axial magnetic field.

4. The method defined in claim 2 wherein one of said disks is formed with holes traversed by a magnetic flux lines of said field.

5. The method defined in claim 2 wherein the superconductor comprises a matrix of a low-resistivity conductor containing a superconductive material.

6. The method defined in claim 2 wherein the superconductor comprises a substrate having a layer of superconductive material deposited thereon.

7. The method defined in claim 6 wherein said substrate is selected from the group which consists of alumina, strontium titanate and sapphire.

8. An apparatus for rotationally coupling a drive member to a driven member, comprising:

disk formed on one of said members and lying in a plane generally perpendicular to an axis of rotation of said one of said members, and another disk formed on the other of said members and lying in a plane generally perpendicular to an axis of rotation of said other of said members, said disk being disposed in planes parallel with one another and spacedly juxtaposed at least partially with one another and being composed at least in part of a high-temperature ceramic superconductor having a critical temperature $T_c$ above 23K;

means for maintaining said disks at a temperature below said critical temperature for a period during which said drive member is to be rotationally coupled to said driven member; and means for applying a magnetic field to said disks effecting magnetic flux coupling thereof, whereby rotation of said disk formed on said drive member effects rotational entrainment of said disk formed on said driven member, said disks being axially juxtaposed and the magnetic field being applied as an axial magnetic field, one of said disk being formed with holes traversed by magnetic flux lines of said field.

9. The apparatus defined in claim 8 wherein said disks are formed at least in part of a superconductive material selected from the group which consists substantially of:

$Y_{1.0}Ba_{1.8}Cu_{3.0}O_{6.3}$, $Bi_2Sr_{3-x}Ca_xCu_2O_{8+y}$, $Tl_2Ca_{3-x}Ba_xCu_2O_{8+x}$, $Pb_2Sr_2(Nd_{0.76}Sr_{0.24})Cu_3O_{8+x}$.

and $BaO$-$K_2Bi_2O_3$-based superconductors, where x is a number less than one.

10. The apparatus defined in claim 9 wherein the superconductor comprises a matrix of a low-resistivity conductor containing a superconductive material.

11. The apparatus defined in claim 9 wherein the superconductor comprises a substrate having a layer of superconductive material deposited thereon.

12. The apparatus defined in claim 9 wherein said substrate is selected from the group which consists of alumina, strontium titanate and sapphire.

13. The apparatus defined in claim 9 wherein said axes are concident.

14. The apparatus defined in claim 9 wherein said axes are radially spaced apart from one another.

15. The apparatus defined in claim 9 wherein said disks having only peripheries overlapping one another.

* * * * *